(12) United States Patent
Raich et al.

(10) Patent No.: US 12,091,079 B2
(45) Date of Patent: Sep. 17, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Thomas Raich, Vandans (AT); Simon Blaettler, Grabs (CH); Robert Galehr, Schaanwald (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/382,358

(22) Filed: Oct. 20, 2023

(65) Prior Publication Data

US 2024/0149936 A1 May 9, 2024

(30) Foreign Application Priority Data

Nov. 3, 2022 (BE) .................................. 2022/5894

(51) Int. Cl.
*B62D 1/185* (2006.01)
*B62D 1/181* (2006.01)

(52) U.S. Cl.
CPC ............. *B62D 1/185* (2013.01); *B62D 1/181* (2013.01)

(58) Field of Classification Search
CPC .................................................... B62D 1/185
See application file for complete search history.

(56) References Cited

U.S. PATENT DOCUMENTS

| 8,197,348 B2 | 6/2012 | Eriksson et al. |
| 2007/0026952 A1 | 2/2007 | Gokano |
| 2020/0331513 A1 | 10/2020 | Bayer et al. |
| 2021/0213998 A1 | 7/2021 | Kurokawa et al. |
| 2023/0242173 A1 | 8/2023 | Raich |

FOREIGN PATENT DOCUMENTS

| BE | 1029836 A1 | * | 11/2022 | | |
| BE | 1029838 A1 | * | 11/2022 | | |
| CN | 113442996 A | * | 9/2021 | ............. | B62D 1/181 |
| CN | 117396392 A | * | 1/2024 | | |
| DE | 20317344 U1 | * | 2/2004 | ............. | B62D 1/185 |
| DE | 102017221004 A1 | | 5/2019 | | |
| DE | 102020205730 A1 | | 11/2021 | | |
| DE | 102022201101 B3 | * | 7/2022 | ............. | B62D 1/185 |
| EP | 2166239 A1 | * | 3/2010 | ............. | F16C 29/041 |
| FR | 2727481 A1 | | 5/1996 | | |
| FR | 2783790 B1 | | 3/2000 | | |
| FR | 2795786 A1 | * | 1/2001 | ............... | B62D 1/16 |
| FR | 2795787 A1 | * | 1/2001 | ............... | B62D 1/16 |
| JP | WO2007083536 A1 | * | 1/2007 | | |
| WO | WO-2005047077 A1 | * | 5/2005 | ............. | B62D 1/185 |
| WO | 2014044881 A1 | | 3/2014 | | |
| WO | WO-2023051908 A1 | * | 4/2023 | | |

* cited by examiner

*Primary Examiner* — Nicole T Verley
(74) *Attorney, Agent, or Firm* — thyssenkrupp North America, LLC

(57) ABSTRACT

A steering column for a motor vehicle, including a casing unit, in which a steering spindle is mounted so as to be rotatable about a longitudinal axis (L) running in the longitudinal direction, and which has at least one inner casing telescopically adjustable in the longitudinal direction in an outer casing tube, comprising a roller guide having at least one bearing support, which is radially supported and movable on the inner casing, and in which at least one roller is mounted so as to be rotatable about a roller axis which is transverse to the longitudinal axis (L).

12 Claims, 4 Drawing Sheets

STEERING COLUMN FOR A MOTOR VEHICLE

CROSS REFERENCE TO RELATED APPLICATION

This application is a U.S. Non-Provisional that claims priority to Belgian Patent Application No. BE 2022/5894, filed Nov. 3, 2022, the entire content of which is incorporated herein by reference.

FIELD

The present disclosure relates to a steering column for a motor vehicle, and more specifically to a steering column enable for improved adaptation to an available installation space.

BACKGROUND

The disclosure relates to a steering column for a motor vehicle, comprising a casing unit, in which a steering spindle is mounted so as to be rotatable about a longitudinal axis running in the longitudinal direction, and which has at least one inner casing telescopically adjustable in the longitudinal direction in an outer casing tube, comprising a roller guide having at least one bearing support, which is radially supported and movable on the inner casing, and in which at least one roller is mounted so as to be rotatable about a roller axis which is transverse to the longitudinal axis, and the roller can be rolled in the longitudinal direction with its outer circumference against the inside of the casing tube, wherein a preloading device interacts with the bearing support in order to preload the roller radially against the casing tube.

To input manual steering commands, a steering wheel or some other manual steering handle is attached to that end of the steering spindle which is at the rear in the direction of travel, which faces the driver and which is mounted in a casing unit of the steering column in such a way as to be rotatable about its longitudinal axis. The casing unit has an outer casing tube, e.g. an outer casing held on the body or an intermediate casing accommodated therein. An inner casing, in which the steering spindle is mounted, is accommodated in this outer casing tube in such a way as to be telescopically adjustable in the longitudinal direction defined by the longitudinal axis. The outer casing tube is held on the vehicle body by means of a carrier unit. Longitudinal adjustment in order to adapt the steering wheel position can be performed by pushing the inner casing in or out relative to the outer casing tube.

There are known simple telescopic arrangements which comprise the casing tube and the inner casing as telescopic elements, and also triple or multiple telescopic arrangements in which the casing tube is accommodated telescopically in an outer casing or in one or more further casing tubes.

In order to enable smooth and, at the same time, low-play adjustment, there is a known practice of providing a linear roller guide between the inner casing and the casing tube, as described, for example, in DE 10 2022 201 101 B1. This guide comprises a roller, which is rotatably mounted relative to the inner casing about its roller axis, said axis being transverse to the longitudinal axis, and can be rolled in the longitudinal direction on the inner side of the casing tube. In order to ensure play-free rolling, the roller is mounted in a bearing support in such a way that it can be moved radially outwards relative to the inner casing. The bearing support is pushed radially outwards by a preloading device, and therefore the roller can be held in play-free rolling contact with the inner side of the casing tube by the radial preload.

The known telescopic arrangement allows smooth, play-free adjustment with high rigidity. However, owing to the fact that the preloading element is axially aligned and supported in terms of its effect, a relatively large axial overall length may be required. This may make adaptation to the available installation space more difficult.

Thus, a need exists to enable improved adaptation to an available installation space. The present disclosure may provide a solution for at least one of these remaining challenges.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
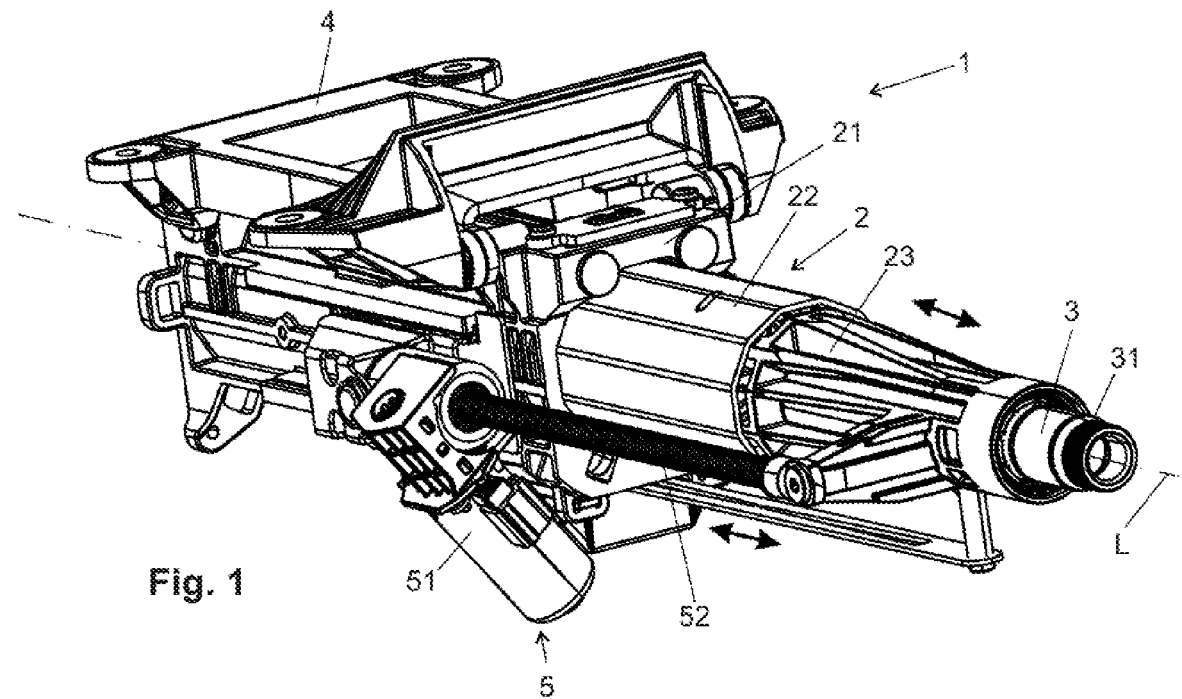
FIG. 1 shows a steering column according to the invention in a schematic perspective view.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In the case of a steering column for a motor vehicle, comprising a casing unit, in which a steering spindle is mounted so as to be rotatable about a longitudinal axis running in the longitudinal direction, and which has at least one inner casing telescopically adjustable in the longitudinal direction in an outer casing tube, comprising a roller guide having at least one bearing support, which is radially supported and movable on the inner casing, and in which at least one roller is mounted so as to be rotatable about a roller axis which is transverse to the longitudinal axis, and the roller can be rolled in the longitudinal direction with its outer circumference against the inside of the casing tube, wherein a preloading device interacts with the bearing support in order to preload the roller radially against the casing tube, it is envisaged according to the disclosure that the preloading device has interacting wedge surfaces on the bearing support and a biasing wedge, which surfaces are inclined with respect to a circumferential direction, wherein the biasing wedge is loaded in the circumferential direction relative to the bearing support by a biasing element.

The circumferential direction corresponds to the axial direction of the roller axis. The wedge surfaces are formed on the bearing support and/or on the biasing wedge and are arranged in such a way that they converge in the circumferential direction which is towards the bearing support when viewed from the biasing wedge. The direction in which the wedge surfaces converge is also referred to as the wedge direction. If the biasing wedge is loaded towards the bearing support in this wedge direction by the biasing element, the support is pushed radially outwards transversely to the circumferential direction by the wedge effect.

According to the disclosure, the biasing wedge can be moved in the circumferential direction relative to the bearing support, and is driven between the bearing support and the inner casing in its wedge direction in such a way that a preloading force, which is oriented transversely to the wedge direction and radially outwards with respect to the longitudinal axis, is exerted on the bearing support via the wedge surfaces. The wedge arrangement or wedge device formed from the biasing wedge and the bearing support thus brings about a deflection of the biasing force exerted on the biasing wedge in the circumferential direction by the biasing element, which acts as a radially outwardly directed preloading force on the bearing support and presses the roller in rolling contact from the inside against the outer casing tube.

The axial overall length of the preloading device according to the disclosure can be determined substantially by the width of the biasing wedge and the bearing support, measured in the longitudinal direction. Owing to the fact that this dimension can be configured relatively freely and can be dimensioned to be correspondingly small, an advantageously smaller installation space and a shorter overall length than in the prior art is made possible.

A further advantage is that the force transmission ratio between the biasing force introduced into the biasing wedge in the circumferential direction by the biasing element and the radial preloading force exerted on the roller as a result can be predetermined in a structurally simple manner by means of the wedge angle enclosed between the wedge surfaces. Here, a relatively shallow, i.e. acute, wedge angle gives rise to a large force transmission ratio. Preferably, the wedge angle can be in a range between 5° and 30°, particularly preferably about 15°.

Provision is preferably made for the biasing element to have a spring element. The spring element forms a force-generating element, which exerts an elastic biasing force on the biasing wedge in the circumferential direction, which biasing force elastically loads the roller in rolling contact via the wedge device. As a result, uniform preloading can be ensured in a structurally simple and permanently functionally reliable manner.

It is advantageous that the biasing wedge is guided in the circumferential direction on the inner casing and is supported radially inwards. The guidance in the circumferential direction ensures reliable functioning of the wedge device under high loads, for example under high transverse forces.

Owing to the fact that the biasing wedge is supported transversely to its wedge direction in the radial direction, radially inwards towards the longitudinal axis, on the inner casing, the bearing support is pressed radially outwards in a defined manner when the biasing wedge is driven in between the bearing support and the inner casing in the wedge direction by the biasing element. The guidance in the circumferential direction and the radial support can be implemented in a structurally simple manner by means of a sliding guide, for example a groove guide, in which the biasing wedge can slide along in the circumferential direction.

It is preferably possible for the biasing element to be arranged between an abutment of the inner casing and the biasing wedge in the circumferential direction. As a force-generating element, the biasing element exerts a biasing force in the circumferential direction on the biasing wedge. It can have a compression spring, for example a helical spring, a diaphragm spring pack or the like. The abutment and the biasing wedge are opposite one another in the circumferential direction, wherein the biasing element is preferably inserted between them under a preload. For example, a compression spring can be inserted and compressed to such an extent that the resilient restoring force corresponds to the required biasing force. In this case, the abutment can be formed in a structurally simple manner on the inner casing, for example in the form of a radial surface, which can also be formed in a recess.

Provision can preferably be made for two biasing wedges to lie opposite one another in the circumferential direction and to interact with respective corresponding wedge surfaces of the bearing support. The two biasing wedges point towards one another in the circumferential direction with their opposite wedge directions. The wedge arrangement can preferably be formed mirror-symmetrically with respect to a radial plane between the biasing wedges, which is perpendicular to the circumferential direction and in which the longitudinal axis lies. The corresponding wedge surfaces on the bearing support are at an obtuse angle to one another, the tip of which is directed inwards towards the longitudinal axis. The symmetrical arrangement is advantageous for producing a uniform radial preloading force.

In the aforementioned embodiment, it is advantageously possible for each of the two biasing wedges to be supported, under a preload in the circumferential direction, against an abutment on the inner casing via a biasing element, for example a spring element such as a compression spring or the like. As a result, the wedge device formed from the two biasing wedges and the bearing support can be held elastically in a quasi-floating manner in the circumferential direction between the two biasing elements. As a result, external forces, for example those due to load reversals or the like, can be absorbed elastically and without tilting by the roller guide.

Provision can be made for the bearing support to be guided on guide surfaces of the inner casing. For example, the bearing support can slide along the guide surfaces with at least one radially directed movement component of the guide. As a result, a defined movement of the bearing support relative to the inner casing along a radial guide path is predetermined when the biasing wedge is driven in between the inner casing and the bearing support in the circumferential direction. In this case, the bearing support can be guided in such a way, in a sliding guide for example, that the preloading force is introduced into the rollers in the direction defined by the guide.

Provision can preferably be made for the bearing support to be arranged in an aperture of the inner casing. The aperture can be designed as an opening which passes through to the outside or as a recess in the outer side of the inner casing. The aperture can have guide surfaces on which the bearing support is guided in the radial direction. Furthermore, the aperture can have abutments for supporting the biasing element(s) and/or the biasing wedge(s) in the circumferential direction, and/or for radially supporting the biasing wedge(s). In the circumferential direction, the aperture or recess preferably extends over an angular segment of less than 90°.

Provision can preferably be made for the roller to be arranged in a preloading plane perpendicular to the longitudinal axis, in which at least two fixed supporting rollers are arranged in a manner distributed over the circumference. In the preloading plane, the roller preloaded in accordance with the disclosure and at least two supporting rollers, each mounted in a radially fixed bearing, are thus mounted on the inner casing in a manner distributed over the circumference. The preloading force introduced into the preloaded roller also presses the supporting rollers against the outer casing tube from the inside. As a preferred option, exactly two supporting rollers spaced apart in the circumferential direction can be arranged in a circumferential region opposite the preloaded rollers with respect to the longitudinal axis. A three-roller bearing is thereby implemented in a preloading plane, which bearing is advantageous in terms of high stiffness and functional reliability.

As a preferred option, a mirror-symmetrical arrangement of the roller and the supporting rollers with respect to a radial plane between the rollers can be implemented.

It is possible for the roller to be rotatably mounted in a plain bearing in the bearing support. In this case, the roller can be rotatably mounted on an axle, for example a bearing pin, which is accommodated in the bearing support. The plain bearing has the advantage of a high stiffness and natural frequency of the bearing arrangement.

Alternatively, it is possible for the roller to be rotatably mounted in a rolling bearing in the bearing support. In this case, the roller can be rotatably mounted on an axle, for example a bearing pin or the like, which is accommodated in the bearing support, via revolving rolling elements, for example a needle ring. Such a rolling bearing has the advantage of low bearing friction, which is beneficial for easy adjustment.

It is possible that the inner casing has a polygonal outer cross section. In this case, the inner casing can be designed as a profile of polygonal cross section having at least one polygonal outer profile, for example as a quadrilateral, hexagonal, octagonal, decagonal or dodecagonal profile. The passage cross section of the outer casing tube, in which the inner casing is telescopically accommodated, corresponds to the polygonal outer profile thereof. The rollers can roll between the edges on the preferably flat side faces of the polygonal profile, the rolling contact between the rollers and the casing tube being wider than in the case of a circular cross section, which is advantageous in terms of high stiffness and lower surface pressure. A further advantage is the clearly defined, rotation-proof arrangement of the inner casing in the casing tube.

Provision can also be made for the casing tube to be accommodated telescopically in an outer casing. In this way, it is possible to provide a multi-telescopic arrangement with at least three telescopic elements, namely the inner casing, the casing tube and the outer casing. If necessary, additional casing tubes can be inserted in between. Multi-telescopic arrangements allow a greater ratio between the maximally shortened and the maximally extended adjustment state of the steering column.

In the various figures, identical parts are always denoted by the same reference signs and are therefore generally named or mentioned only once in each case.

Figure 2:
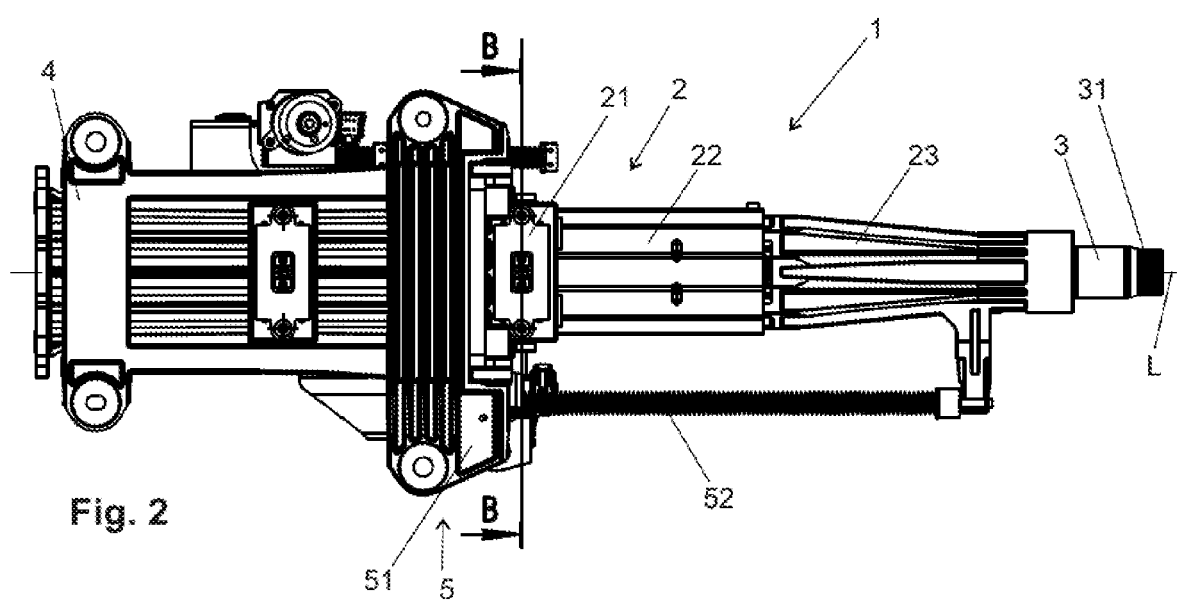
FIG. 2 shows the steering column according to FIG. 1 in a view from above.
Figure 3:
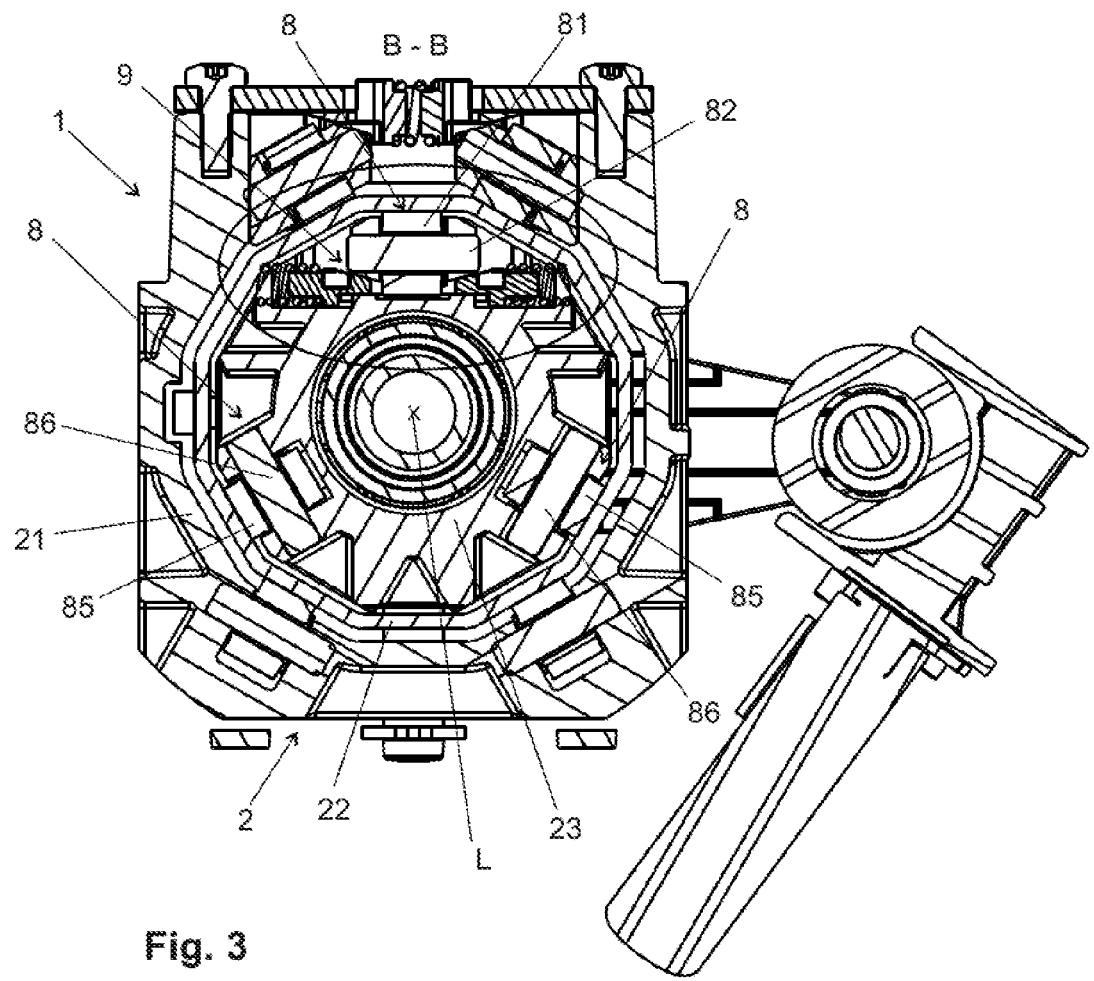
FIG. 3 shows a section B-B through the steering column according to FIG. 1.

FIG. 1 shows a steering column 1 according to the disclosure in a side view with respect to the direction of travel, the direction of travel pointing to the right. FIG. 2 shows a view from above. FIG. 3 shows a cross section B-B of FIG. 2, which is reproduced in an enlarged detail illustration in FIG. 3.

The steering column 1 has a casing unit 2, which comprises an outer casing 21 and an outer casing tube 22, which is accommodated therein so as to be telescopically adjustable in the longitudinal direction of a longitudinal axis L, and an inner casing 23, which is likewise accommodated in the casing tube 22 so as to be telescopically adjustable in the longitudinal direction, as indicated by the double arrow. The outer casing 21, the casing tube 22, and the inner casing 23 can also be referred to collectively as the telescopic elements 21, 22, 23.

In the example shown, the casing tube 22 is designed as a polygonal hollow profile, specifically as a dodecagonal tube. The inner casing 23 accommodated therein has a corresponding dodecagonal outer cross section.

A steering spindle 3 is mounted in the casing unit 2 so as to be rotatable about the longitudinal axis L. At an end section which is at the rear with respect to the direction of travel and, in the installed position, is directed towards the driver's position, the steering spindle 3 has a connection section 31 for attaching a manual steering handle (not shown here), e.g. a steering wheel.

The casing unit 2, specifically the outer casing 21, is held by a carrier unit 4, which can be attached to a vehicle body (not shown here).

An electric-motor adjusting drive 5, which is designed as a spindle drive, is arranged between the inner casing 21 and the outer casing 23. This drive comprises a drive unit 51, which is fixed on the outer casing 23 and has a spindle nut—not explicitly illustrated here—which can be driven by an electric motor so as to rotate about its thread axis and in which a threaded spindle 52 engages. With its free end, the threaded spindle 52 is connected non-rotatably to the inner casing 23 and so as to be fixed in the longitudinal direction. By rotating the spindle nut, the threaded spindle 52 can be moved forwards or backwards relative to the drive unit 51, depending on the direction of rotation, as indicated by the double arrow in FIG. 1. As a result, the inner casing 23 and the casing tube 22 can be retracted or extended telescopically in the longitudinal direction relative to the outer casing 21.

Figure 4:
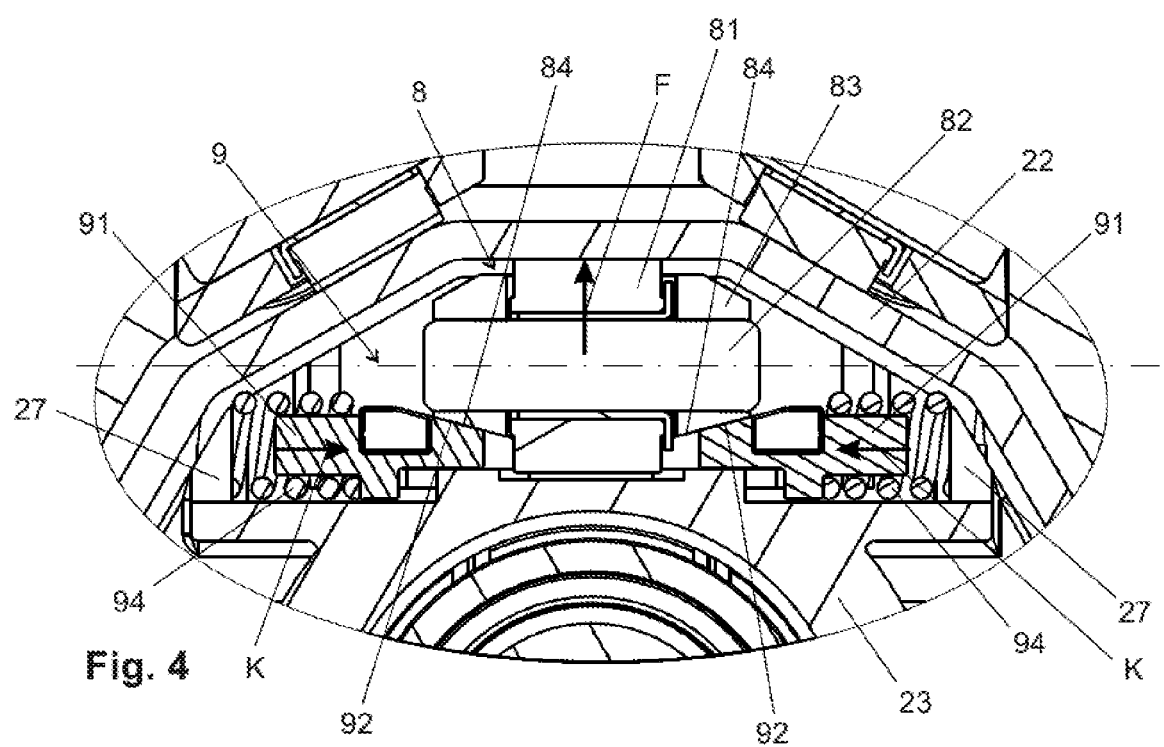
FIG. 4 shows an enlarged detail view of FIG. 3.

A roller guide 8, which can be seen in FIGS. 3 and 4, comprises a roller 81, which is mounted in a bearing support 83 so as to be rotatable about a roller axis 82 transverse to the longitudinal axis. The bearing support 83 is supported on the inner casing 23 and can be moved radially relative thereto. The roller 81 is preloaded radially outwards in rolling contact against the inner side of the casing tube 22, as will be explained below.

A preloading device 9 according to the disclosure interacts with the bearing support 83. This has two biasing wedges 91, which each have wedge surfaces 92 that are inclined with respect the circumferential direction, which corresponds to the axial direction of the roller axis 82. These each converge in the wedge direction K. The wedge directions K of the two biasing wedges 91 are directed towards one another in the circumferential directions, as indicated in FIG. 4 by the arrows drawn in the biasing wedges 91.

The wedge surfaces 92 of the biasing wedges 91 bear slidingly against corresponding wedge surfaces 84 on the bearing support 83.

Each of the two biasing wedges 91 is in each case supported in the circumferential direction against an abutment 27 on the inner casing 23 by means of a spring element 94, in the example a helical spring embodied as a compression spring. At the other end, each spring element 94 is resiliently braced in the circumferential direction against one of the biasing wedges 91. As a result, an elastic biasing force is applied to the biasing wedges 91 in the oppositely directed wedge directions K, which are indicated by arrows. The biasing wedges 91 are thereby driven in in the circumferential direction between the outer side of the inner casing 23 and the wedge surfaces 84 of the bearing support 83. In this case, the latter is forced radially outwards by the wedge effect, as indicated in FIG. 4 by the upward-directed arrow drawn in the roller 81, which denotes the preloading force F with which the roller 81 is pressed in rolling contact against the inside of the casing tube 22.

The generation and application of the preloading force F as described is illustrated once again with reference to the exposed schematic illustrations of the preloading device 9. It can be seen from this how the biasing force (spring force) exerted in opposite wedge directions K on the biasing wedges 91 by the spring elements 94 is transmitted via the corresponding wedge surfaces 92 and 84 to the bearing support 83 and converted into a radial preloading force F of the roller 81.

Figure 5:
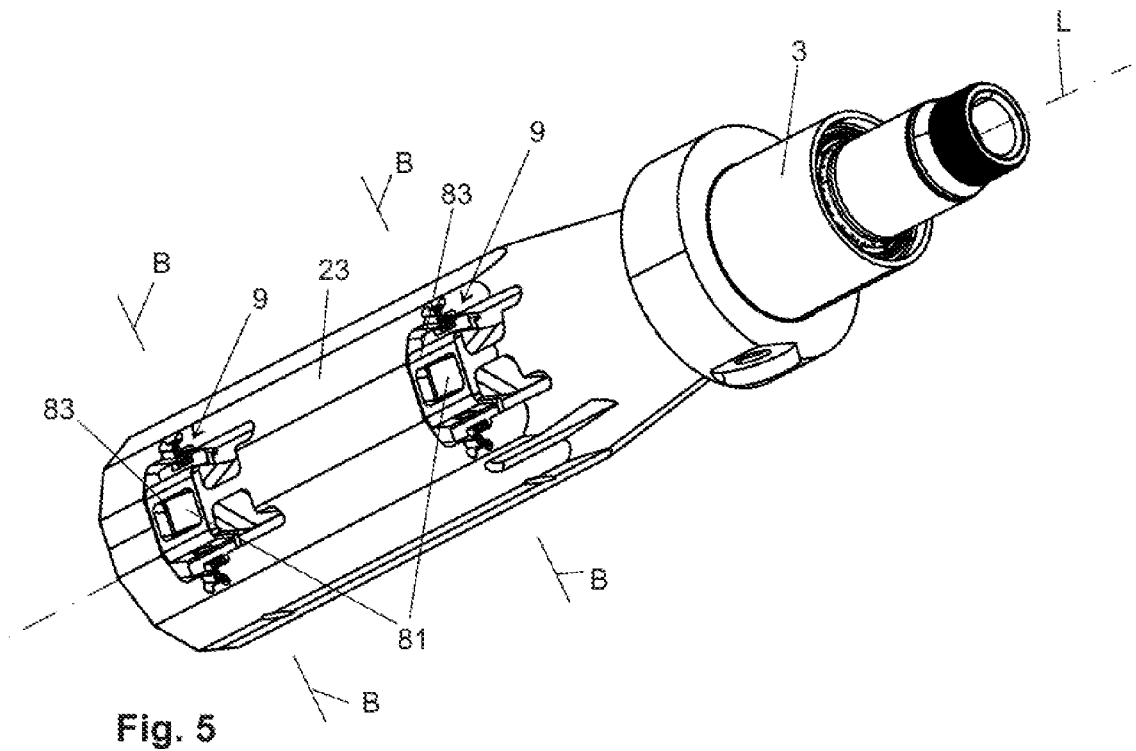
FIG. 5 shows the inner casing of the steering column according to FIG. 1 in an exposed schematic perspective view.

The cross section B-B according to FIG. 3 defines a preloading plane. The axially offset arrangement of two preloading devices 9 according to the disclosure on the inner casing 23 in two axially spaced-apart preloading planes is shown in FIG. 5, both of which are denoted by B-B because of the fundamentally identical design.

Figure 6:
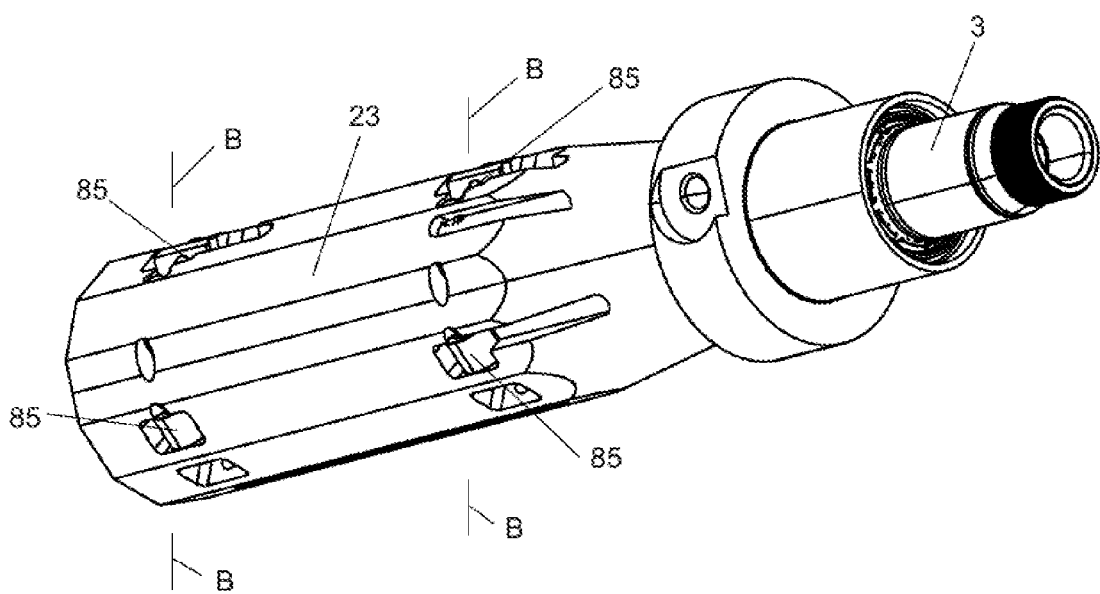
FIG. 6 shows the inner casing of the steering column according to FIG. 1 in a further exposed schematic perspective view similar to FIG. 5.
Figure 7:
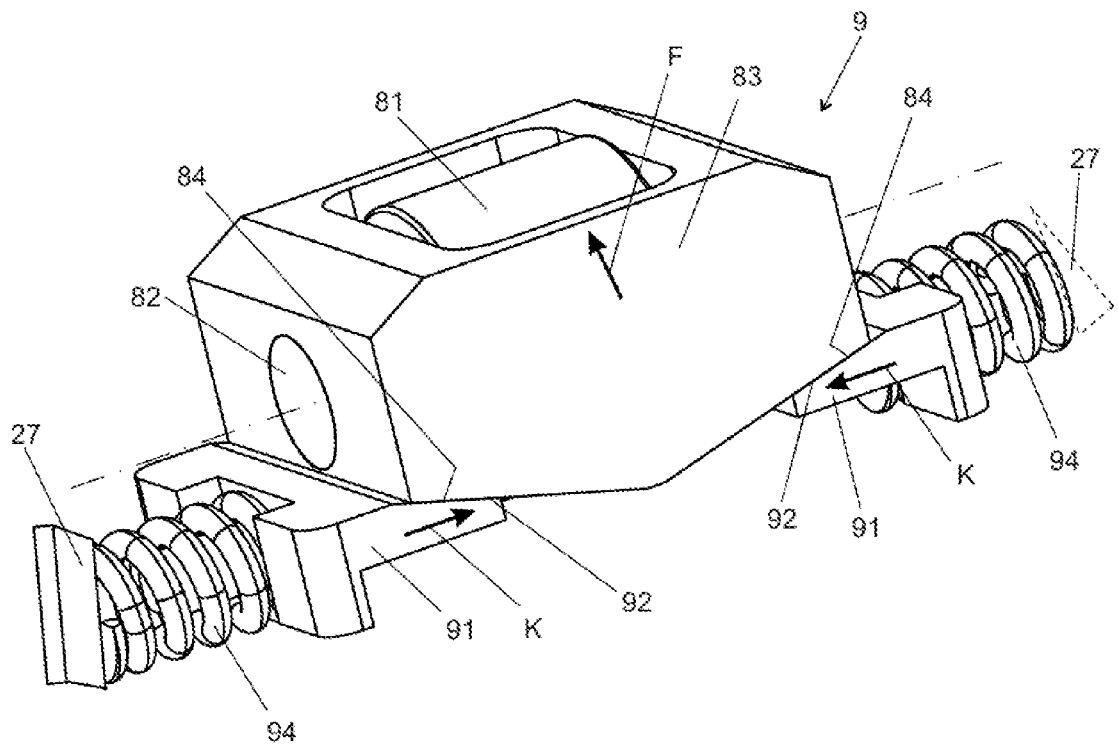
FIG. 7 shows an exposed schematic partial view of a preloading device according to the invention.
Figure 8:
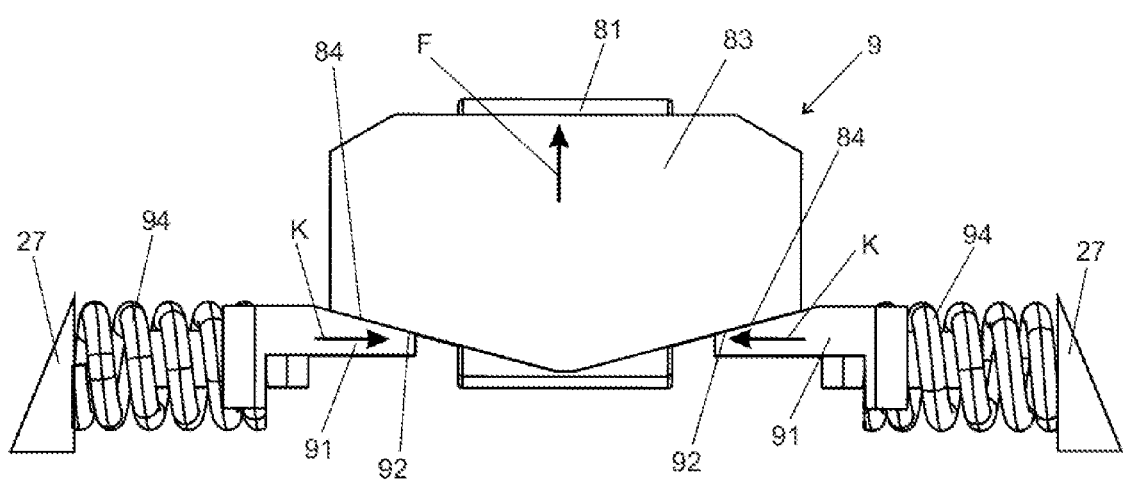
FIG. 8 shows another view of a preloading device according to FIG. 7.

In addition to the roller 81 preloaded according to the disclosure, the roller guide 8 has two supporting rollers 85, which are mounted on the inner casing 23 so as to be rotatable about fixed axes 86 and can likewise roll in the longitudinal direction on the inner side of the casing tube 22. Relative to the roller 81, the supporting rollers 85 are arranged symmetrically on the circumference, being offset by 120° in the example shown. As a preferred option, in each case two supporting rollers 85 can be arranged together with a preloaded roller 81 in a preloading plane B-B, as indicated in FIGS. 5 and 6.

LIST OF REFERENCE SIGNS

1 Steering system
2 Casing unit
21 Outer casing
22 Casing tube
23 Inner casing
27 Abutment
3 Steering spindle
31 Connection section
4 Carrier unit
5 Adjusting drive
51 Drive unit
52 Threaded spindle
8 Roller guide
81 Roller
82 Roller axis
83 Bearing support
84 Wedge surface
85 Supporting roller
86 Axis
9 Preloading device
91 Biasing wedge
92 Wedge surface
94 Spring element
L Longitudinal axis
K Wedge direction
F Preloading force
B-B Preloading plane

What is claimed is:

1. A steering column for a motor vehicle, comprising:
a casing unit, in which a steering spindle is mounted so as to be rotatable about a longitudinal axis (L) running in the longitudinal direction, and which has at least one inner casing telescopically adjustable in the longitudinal direction in an outer casing tube, comprising a roller guide having at least one bearing support, which is radially supported and movable on the inner casing, and in which at least one roller is mounted so as to be rotatable about a roller axis which is transverse to the longitudinal axis (L);
the roller is configured to be rolled in the longitudinal direction with its outer circumference against the inside of the casing tube, wherein a preloading device interacts with the bearing support to preload the roller radially against the casing tube, wherein the preloading device includes interacting wedge surfaces on the bearing support and a biasing wedge, which surfaces are inclined with respect to a circumferential direction, wherein the biasing wedge is loaded in the circumferential direction relative to the bearing support by a biasing element.

2. The steering column of claim 1, wherein the biasing element includes a spring element.

3. The steering column of claim 1, wherein the biasing wedge is guided in the circumferential direction on the inner casing and is supported radially inwards.

4. The steering column of claim 1, wherein the biasing element is arranged between an abutment of the inner casing and the biasing wedge in the circumferential direction.

5. The steering column of claim 1, wherein the two biasing wedges lie opposite one another in the circumferential direction and interact with respective corresponding wedge surfaces of the bearing support.

6. The steering column of claim 1, wherein the bearing support is guided on guide surfaces of the inner casing.

7. The steering column of claim 1, wherein the bearing support is arranged in an aperture of the inner casing.

8. The steering column of claim 1, wherein roller is arranged in a preloading plane (B-B) perpendicular to the longitudinal axis (L), in which at least two fixed supporting rollers are arranged in a manner distributed over the circumference.

9. The steering column of claim 1, wherein the roller is rotatably mounted in a plain bearing in the bearing support.

10. The steering column of claim 1, wherein the roller is rotatably mounted in a rolling bearing in the bearing support.

11. The steering column of claim 1, wherein the inner casing includes a polygonal outer cross section.

12. The steering column of claim 1, wherein the casing tube is accommodated telescopically in a further outer casing.

* * * * *